United States Patent
Fischer et al.

(10) Patent No.: US 6,520,737 B1
(45) Date of Patent: Feb. 18, 2003

(54) OFFSHORE WIND TURBINE WITH LIQUID-COOLING

(75) Inventors: Torsten Fischer, Ring Købing (DK); Niels Vilsbøll, Støvring (DK)

(73) Assignee: NEG Micon A/S, Randers (DK)

(*) Notice: Subject to any disclaimer, the term of this patent is extended or adjusted under 35 U.S.C. 154(b) by 0 days.

(21) Appl. No.: 09/959,778
(22) PCT Filed: May 8, 2000
(86) PCT No.: PCT/DK00/00230
§ 371 (c)(1),
(2), (4) Date: Apr. 26, 2002
(87) PCT Pub. No.: WO00/68570
PCT Pub. Date: Nov. 16, 2000

(30) Foreign Application Priority Data

May 7, 1999 (DK) .................................. 1999 00630

(51) Int. Cl.⁷ .............................................. F03B 15/06
(52) U.S. Cl. .................... 415/4.3; 415/4.5; 415/175; 415/177; 415/908
(58) Field of Search ................ 415/3.1, 4.3, 4.5, 415/175, 177, 908; 290/44, 55

(56) References Cited

U.S. PATENT DOCUMENTS 3,952,723 A * 4/1976 Browning .................. 126/247
5,384,489 A * 1/1995 Bellac ........................ 290/44
5,436,508 A   7/1995 Sorensen
6,285,090 B1 * 9/2001 Brutsaert et al. ............. 290/55
6,400,039 B1 * 6/2002 Wobben ..................... 290/44

* cited by examiner

Primary Examiner—Edward K. Look
Assistant Examiner—Ninh Nguyen
(74) Attorney, Agent, or Firm—Birch, Stewart, Kolasch & Birch, LLP (57) ABSTRACT

An offshore wind turbine is disclosed wherein the power transmission in the nacelle is cooled by means of a liquid conducted to the nacelle from the tower on which the nacelle is pivotally arranged around a vertical yawing axis. The liquid transfers heat to the seawater near the turbine which is used as a heat sink of low temperature and enormous heat capacity as compared to traditional air cooling. The liquid is conducted in a closed circuit and the cooling system may comprise more than one cooling circuit. The flow of cooling-liquid may be conducted between the tower and the nacelle through a heat transfer unit having a first part that is stationary with respect to the tower and a second part that is stationary with respect to the nacelle. The parts have at least one annular passageway for a liquid flow defined between abutting surfaces of the parts.

47 Claims, 6 Drawing Sheets

OFFSHORE WIND TURBINE WITH LIQUID-COOLING

This application is the national phase under 35 U.S.C. §371 of PCT International Application No. PCT/DK00/00230, which has an International filing date of May 8, 2000, which designated the United States of America and was published in English.

The present invention relates to an offshore wind turbine wherein the power transmission placed in the nacelle is cooled by means of a liquid, such as seawater, oil, or glycerol/water, that is conducted to the nacelle from the tower on which the nacelle is pivotally arranged around a vertical yawing axis. The liquid transfers the excessive heat from the power transmission system to the seawater near the turbine which is used as a heat sink of low temperature and enormous heat capacity as compared to traditional air cooling. The liquid is conducted in an open or in a closed circuit and the cooling system may comprise more than one cooling circuit.

The flow of cooling-liquid is in a particular embodiment of the invention conducted between the tower and the nacelle through a heat transfer unit having a first part that is stationary with respect to the tower and a second part that is stationary with respect to the nacelle. The parts have at least one passageway for a liquid flow defined between substantially abutting surfaces of the parts, preferably an annular passageway.

BACKGROUND OF THE INVENTION

It is known to provide cooling for the power transmission system in the nacelle of a wind turbine by means of an air intake arranged on the upwind side of the nacelle and directing the flow of air from the intake around the parts of the power transmission system. Alternatively, one or more parts of the power transmission system may have a liquid cooling system comprising a heat exchanger that is cooled by the flow of air from the air intake.

Such a cooling system has certain disadvantages. The air intake may be blocked by birds or by ice formed from rainwater, and the air intake may for that reason be provided with means for preventing such blockage, such as a fan for providing a cleaning counter flow of air or heating means for melting ice. It is furthermore becoming increasingly difficult to provide sufficient cooling capacity as the power output of the new generations of wind turbines increases. Insufficient cooling may cause mechanical breakdown of parts of the power transmission system and lowers the efficiency coefficient of the parts.

A more efficient cooling system may on the other hand provide for some of the parts of the power transmission system to be constructed more compact, in particular the electronic parts. The loss in the power transmission system is typically of the order of 6–10% of the power output of the wind turbine, the loss in the gearbox and in the generator being of approximately the same magnitude. in particular the generator may advantageously be cooled more efficiently in order to prevent break-down of the generator and both the rotor and the stator of the generator may be cooled. Furthermore, the power control system and the electrical transformer, e.g. comprising a frequency converter, may also constitute a part of the power transmission system and may also be cooled to obtain better efficiency.

U.S. Pat. No. 5,436,508 discloses a wind turbine used in an energy production and storing system in which the wind rotor drives an electric generator and a heat pump which is used to produce heat that may be stored and used for later production of electricity in periods of slacks winds. Excessive electricity production may also be converted into heat and be stored. Liquid is circulated between the tower and the nacelle, which may turn relatively to the tower, to transfer heat from the heat pump to the storage in the ground. This liquid is not used directly to cool the power transmission but a blower forces a cooling air stream past the electrical generator and to the heat pump. According to the present invention, a cooling liquid is transferred to the nacelle from the tower for the purpose of cooling the power transmission system, i.e. the gear box and/or the electrical generator and/or the power control system and electrical transformer so as to obtain a decreased power loss in the transmission system and other advantages as mentioned above.

DESCRIPTION OF THE INVENTION

It is an object of the present invention to provide an offshore wind turbine having an efficient cooling system for the power transmission system located in the nacelle of the wind turbine by means of using seawater as a heat sink for the cooling system. In particular, it is an object of the present invention to provide a cooling system that during periods of warm weather may provide a higher temperature difference between the cooling agent for cooling the power transmission system and the system itself than the temperature difference provided by the air.

An efficient cooling system for the power transmission system can be provided by cooling at least a part of the power transmission system with a cooling liquid that is conducted from the tower and to the nacelle. It is however a problem to have means for conducting the cooling liquid from the tower and to the nacelle for the reason that the nacelle must be able to pivot relatively to the tower, so-called yawing, in order to situate the main shaft parallel to the direction of the wind from which shaft the blades of the wind turbine extend perpendicularly to the main shaft.

Thus, it is a further object of the present invention to provide a device for forming one or more passage ways for liquid between the nacelle and the tower during at least most yawing positions of the nacelle.

Thus, the present invention relates to an off-shore wind turbine comprising a stationary part including a tower extending substantially vertically, a nacelle comprising a wind rotor having at least one blade arranged on a main shaft having a substantially horizontal rotation axis, and a power transmission system, a yawing system comprising a stationary part being fixed to an upper end of the tower and a movable part being fixed to the nacelle, the stationary part and the movable part being designed so that the nacelle is being supported vertically and horizontally by the tower and may pivot relatively to the tower about a substantially vertical yawing axis, and a cooling system for transferring excessive heat from the power transmission system to seawater surrounding the wind turbine, the cooling system comprising first conduction means for conducting a flow of cooling liquid from the stationary part of the wind turbine and to the nacelle during normal operational conditions and at most positions of the nacelle relative to the tower, pumping means for pumping the flow of cooling liquid through the first conducting means and first heat exchanging means for transferring heat from the power transmission system to the cooling liquid. The stationary part of the wind turbine includes further a support for supporting the tower, normally being a foundation on the seabed. However, the stationary part may be positioned on a floating support that is connected to anchoring blocks on the ground or seabed with wires, so that the stationary part may move primarily up and down relatively to the ground.

The wind rotor has at least one blade but it is preferred that it has two or three blades. Naturally, a wind turbine with a rotor having even more blade can also be made according to the present invention. The blades are mounted on a main shaft extending along a rotation axis that is substantially horizontal by which is understood that the axis may be tilted as much as about 10 degrees to horizontal so that the end of the main shaft carrying the rotor is elevated with respect to the other end.

The power transmission system is the system transmitting the power induced by the wind on the blades to a power output from the wind turbine. The power transmission system may comprise various parts depending on the requirement to the individual wind turbine, the parts being an electrical generator and/or a gear box and/or bearings for the main shaft and may further include a frequency converter for controlling the frequency of the power delivered to a power supply system so that the rotational speed of the generator optionally may be variable, it may include a transformer and/or an AC/DC converter and it may include other kinds of power electronics circuitry and/or control units and computers for controlling the operation of and the power output from the wind turbine.

The yawing system is provided to ensure that the main shaft during normal operation of the wind turbine is parallel to the direction of the wind so that as much power as possible is extracted from the wind. The yawing system may be driven by a motor which is commonly used for up-wind turbines, whereas the yaw angle of down-wind turbines may be controlled solely by the action of the wind on the wind rotor.

In a simple embodiment of the invention, seawater is conducted from the interior of the tower of an offshore based wind turbine to the nacelle where it is used for cooling at least a part of the power transmission system whereupon it is discharged from the nacelle through a pipe to the exterior.

In another embodiment of the invention, the cooling system further comprises second conduction means for conducting a flow of liquid from the nacelle and to the stationary part of the wind turbine during normal operational conditions and at most positions of the nacelle relative to the tower, the first conduction mean and the second conduction means forming part of a single circuit.

The second conduction means is used for conducting the return flow of the liquid after it has been used to cool the power transmission system or parts thereof.

The cooling liquid flowing in at least one of the conduction means of the cooling system may be seawater in which case the material the conduction means are formed from must be resistant against corrosion caused by seawater.

It is however preferred that the circuit is a closed circuit and that the cooling system further comprises second heat exchanging means for transferring heat from the cooling liquid to the seawater, the second heat exchanging means being placed in or in the vicinity of the stationary part of the wind turbine.

The closed circuit may in particular be formed so that the cooling liquid therein can be pressurised, the closed circuit being sealed off from the environment in a substantially pressure-proof manner, and wherein the cooling liquid at least substantially fills the interior of the circuit. Thereby, the flow of the cooling liquid may be driven by one pump only, and the pumping means for pumping the flow of the cooling liquid through the closed circuit may solely be situated in the nacelle which is preferred for maintenance reasons and constructive reasons.

The circuit of the cooling system may be a closed circuit so that the cooling liquid contained in the circuit may be re-circulated. In this case, the liquid flowing in at least one of the at least one closed circuits may be an oil, for instance may the closed circuit wherein the oil flows comprise a lubricating circuit of at least a part of the power transmission system, the oil being a lubricant of said part of the power transmission system.

The liquid flowing in the closed circuit may comprise water, preferably mixed with an agent for lowering the freezing temperature of the water, such as methanol or another alcohol, a salt such as sodium chloride or advantageously glycerol.

The closed circuit comprises a second exchanging means of one kind or the other, the term being understood in a broad sense ranging from common heat exchangers comprising a tube bank or plates to the utilisation of parts of the outer wall of the tower as a heat exchanging means for exchanging heat between the cooling liquid and the exterior of the tower, i.e. the surrounding seawater.

At least one of the heat exchanging means may be placed in or in the vicinity of the stationary part of the wind turbine, such as near an upper end of the tower where the distance to the nacelle is short or near a lower end of the tower where seawater may be readily accessible.

The seawater may exchange heat with the cooling liquid by natural convection or pure conduction but it is preferred for an effective heat exchange and for decreasing the requirements of heat exchanging surface area that the cooling system further comprises second pumping means for forcing a flow of the seawater past heat exchanging surfaces of the second heat exchanging means.

A common construction for an offshore wind turbine comprises a hollow tower which is partly submerged into the sea and partly filled with seawater. The heat from the power transmission system may advantageously be transferred to said seawater within the tower by means of the cooling system. Offshore positions are generally advantageous for the efficiency and power production of a wind turbine and the seawater within the tower is readily accessible and an intake of the cooling system for seawater will not be clogged by seaweed, jellyfish, etc.

The cooling system according to the invention may further comprises at least one further closed circuit according to the above description for conducting a flow of a cooling liquid between the nacelle and the stationary part of the wind turbine during normal operational conditions and at most positions of the nacelle relative to the tower. The different circuits may comprise the same cooling liquid, but it is preferred that different types of cooling liquids are used with different circuits, in particular that the gear box uses lubrication oil and that the electrical generator and the optional electrical transformer uses a glycerol/water mixture as a cooling liquid.

In a preferred embodiment, the cooling system comprises system control means for controlling its operation, the control means comprising a plurality of temperature sensors each adapted for detecting a temperature of a part of the transmission system or the cooling liquid and for producing an output accordingly to the system control means, heat exchanger control means for controlling the operation of at least two heat exchanging means of the first heat exchanging means, said at least two heat exchanging means transferring heat from separate parts of the power transmission system, and pump control means for controlling the operation of the pumping means, the system control means being adapted to control the operation of the cooling system so that the temperature of the parts of the power transmission system is aimed to be within predefined temperature ranges.

The lubricating oil in the gear box as well as other parts of the power transmission system may during cease of operation in periods of cold whether become so cold that a restart of the wind turbine is difficult or impossible. In such a situation it is advantageous that the cooling system further comprises a heat pump arranged for transferring heat from the seawater to the cooling liquid so as to heat the cooling liquid, and that the system control means is adapted to control the cooling system to raise the temperature of parts of the power transmission system if the temperature of said parts is below a predetermined threshold value.

The wind turbine may be provided with an opening defined between the nacelle and the tower, said opening being positioned so that the vertical yawing axis passes through the opening so that cables, in particular at least one power cable for transferring power from the power transmission system may pass through the opening as well as cables for control systems of the wind turbine.

Also, at least one liquid conducting means forming part of the cooling system may pass through the opening. According to one embodiment, at least one of the at least one liquid conducting means is a pipe being concentric with the vertical yawing axis and being fixed with respect to either the tower or the nacelle. According to another embodiment of the invention at least one of the liquid conducting means is a flexible hose. A liquid conducting means that passes the opening together with power cables may be heated by power cables so that the cooling of the power transmission system may be lass efficient, for which reason the wind turbine may comprise heat isolating means between at least one of the at least one power cable and at least one of the at least one liquid conducting means so as to reduce heat transfer there between.

A wind turbine that comprises flexible power cables and/or flexible hoses passing a central opening should comprise drive means for driving the pivoting of the nacelle relatively to the tower and control means for controlling said drive means so that the nacelle will pivot less than a predetermined number of turns relatively to a predetermined position of the nacelle so as to prevent excessive twisting of flexible parts passing through the opening and being fixed at one end to the nacelle and at an other end to the stationary part.

The present invention relates in a second aspect to a wind turbine comprising a stationary part including a tower extending substantially vertically, a nacelle comprising a wind rotor having at least one blade arranged on a main shaft having a substantially horizontal rotation axis and a power transmission system, a yawing system comprising a stationary part being fixed to an upper end of the tower and a movable part being fixed to the nacelle, the stationary part and the movable part being designed so that the nacelle is being supported vertically and horizontally by the tower and may pivot relatively to the tower about a substantially vertical yawing axis, and a cooling system for transferring heat from the power transmission system and comprising first conduction means for conducting a flow of cooling liquid from the stationary part of the wind turbine and to the nacelle during normal operational conditions and at most positions of the nacelle relative to the tower, pumping means for pumping the flow of cooling liquid through the first conducting means and first heat exchanging means for transferring heat from the power transmission system to the cooling liquid, the cooling system further comprising a transfer unit for transferring liquid between the nacelle and the stationary part of the wind turbine, the unit comprising a first part being at least substantially stationary relatively to the tower and a second part being at least substantially stationary with respect to the nacelle, the first part and the second part being designed so that at least one passage way for a liquid flow is defined between substantially abutting surfaces of the parts during normal operational conditions and at most positions of the nacelle relatively to the tower, the passage way being part of the first conduction means of the cooling system for conducting the flow of cooling liquid.

The heat transfer unit could be the previously mentioned pipe through a central opening, but preferably at least a part of the at least one passage way for the liquid flow between the nacelle and the stationary part of the wind turbine is defined by means of a surface of the first part, a surface of the second part and by means of a first and of a second sealing means. The first and the second sealing means each forms in an even more preferred embodiment a circle with its centre on the vertical yawing axis and each of the first and the second sealing means extends in a plane being perpendicular to the yawing axis, whereby an annular passage way for liquid flow is defined between the first and the second sealing means and said surfaces of the first and the second part.

According to one embodiment, the first and the second sealing means extend in substantially the same plane and form concentric circles. Alternatively, the first and the second sealing means may extend in planes having a mutual distance along the vertical yawing axis so the surfaces may be parallel to the yawing axis so that the first and the second sealing means form circles have substantially the same diameter or the surfaces may have a conical shape so that the first and the second sealing means form circles having different diameters.

The first part and the second part of the transfer unit should each be equipped with at least one channel formed therein between the exterior and each of the at least one passage ways for a liquid flow defined between surfaces of the parts of the transfer unit, said channels being parts of the conduction means for conducting a flow of liquid.

At least one of the sealing means of a transfer unit may comprise an O-ring formed from a resilient material. It is an advantage if only one of the first and second Dart of the transfer unit comprises a recess for retaining said O-ring so that one of the first and the second part of the transfer unit may have a plane surface for interfacing with the other part which plane surface simplifies the manufactory of that part.

Alternatively or additionally, at least one of the sealing means may be a narrow clearance formed by surfaces of the first and the second part of the transfer unit so that said surfaces constitute a labyrinth packing and/or at least one of the sealing means may comprise a flexible elongated strip of which one edge is fixed to the first part, respectively to the second part, and the other edge is forced into abutting contact with a surface of the second part, respectively the first part. The strip may be forced into abutting contact at least partly by the pressure of the fluid and/or the strip may be formed from a resilient material so that the edge of the strip is forced into abutting contact at least partly by resilient forces.

The transfer unit should be supported by the tower and the second part be induced to follow the pivotal movements of the nacelle by a carrier mounted on the second part and engaging with the nacelle. Alternatively, the transfer unit could be supported by then nacelle and the first part be induced to remain stationary with respect to the tower by a carrier mounted on the first part and engaging with the tower. Both ways, the tolerance of the mutual pivotal movement between the two parts may be very low compared to the tolerance that is normally required from the yawing system.

However, the transfer unit may constitute an integrated part of a yaw bearing of the yawing system, said bearing being designed for absorbing forces between the nacelle and the tower. This embodiment will in most cases require a lower tolerance of the yawing system than normally, but the arrangement is advantageously because the number of parts of the wind turbine may be reduced and the yaw bearing and the transfer unit may be manufactured within the same cycle of operation.

According to the invention, more than one passageway for a liquid flow for the cooling system through the transfer unit may be defined similar to the one described above.

At least a part of the transfer unit may be formed from a synthetic material which is resistant to corrosion caused by seawater and is light compared to other materials and is therefore handled easier during construction and maintenance of the wind turbine.

Alternatively or additionally, at least a part of the transfer unit may be formed from an aluminium alloy, which is also light and is more wear resistant than most synthetic materials. It is however necessary to choose the alloy carefully if the alloy may come into contact with seawater due to the risk of corrosion.

At least a part of the transfer unit may be formed from a stainless steel alloy which is both wear and corrosion resistant but at the same time is heavy and may be rather expensive and can provide difficulties during manufacturing of the part.

Another alternative for at least a part of the transfer unit is to form it from cast iron, which is also heavy and may be corroded but is inexpensive and easier to form the part from.

The wind turbine with the transfer unit may be regarded as an invention in itself, but a preferred embodiment of the offshore wind turbine according to the invention comprises the disclosed transfer unit.

BRIEF DESCRIPTION OF THE FIGURES

Certain embodiments of the invention are shown in the figures for the purpose of illustrating some of the possible ways to carry out the invention.

All of the figures are vertical cross sections of heat transfer units placed in a wind turbine with the purpose of conducting a cooling liquid between the tower and the nacelle.

DETAILED DESCRIPTION OF THE FIGURES

Figure 1:
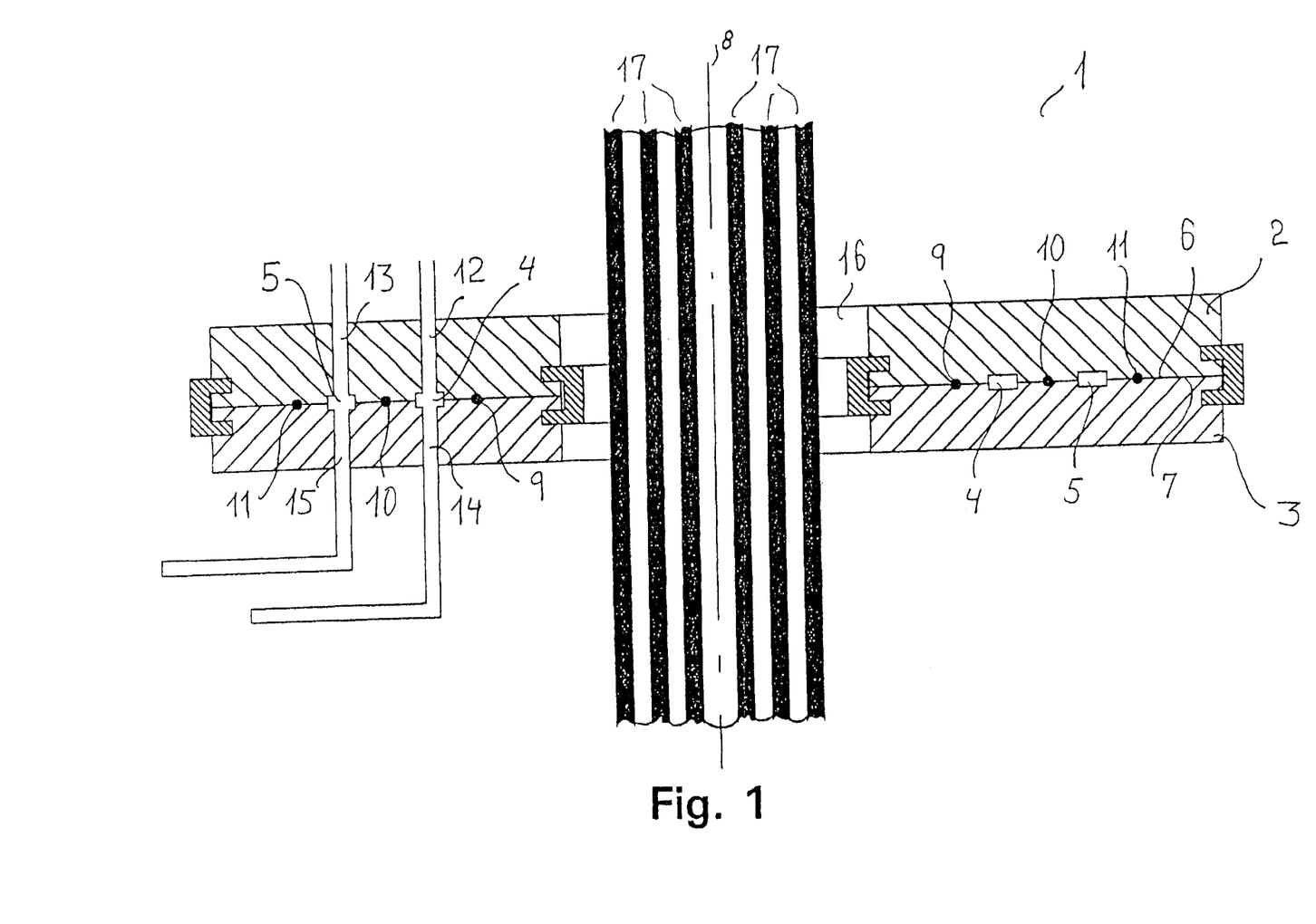
FIG. 1 is a cross section of a transfer unit with two passageways for liquids defined between horizontal surfaces of the two parts.

The transfer unit 1 shown in FIG. 1 comprises an upper part 2 which during yawing is substantially stationary with respect to the nacelle and a lower part 3 that is stationary with respect to the tower. Two annular passage ways 4, 5 for flow of a cooling liquid are defined between surfaces 6, 7 of the two parts 2, 3, one passage way 4 is for conducting a colder liquid from the tower and to the nacelle and one passage way 5 is for conducting the warmer liquid back to the tower. The two surfaces 6, 7 are perpendicular to the yawing axis 8. The passage ways 4, 5 are each formed by a circular recess in each of the surfaces 6, 7 so that the passage ways 4, 5 are defined at each position of the two parts 2, 3 relatively to each other when the upper part 2 during normal operation of the wind turbine pivots about the yawing axis 8. The centre of the recesses is situated on the yawing axis 8. The passageways 4, 5 are further defined by three O-rings 9, 10, 11 formed from a resilient material such as rubber which O-rings prevent the liquid flowing through the passage ways 4, 5 from leaking to the environment. Circular recesses having their centres on the yawing axis 8 are formed in the two surfaces 6, 7 for retaining the O-rings in their operational position.

Channels 12–15 are formed in the two parts 2, 3 of the transfer unit 1 for providing access for the flow of liquid from and to the nacelle and from and to the tower through the passageways 4, 5. Only one channel 12–15 is formed in each part 2, 3 for each flow of a liquid in the embodiment shown in FIG. 1 and the channels 12–15 are perpendicular to the interfacing surfaces 6, 7 of the two parts 2, 3. However, two or more channels may be formed in one or both parts 2, 3 for each flow of a liquid and one or more of the channels may be at another angle than right to the surfaces 6, 7 and/or be of other forms than straight, all according to the present invention.

The transfer unit is formed with an opening 16 defined at is centre so that the yawing axis 8 passes through the opening 16. Power cables 17 for conducting the electrical power generated by the generator placed in the nacelle from the nacelle and to the tower pass through the opening 16.

The cooling circuit of which the passage ways 4, 5 and the channels 12–15 form parts may be a closed circuit in which a cooling liquid flows, the liquid being such as seawater, that may be salt, water mixed with glycerol or another anti-freezing agent in order to prevent ice from forming in the circuit, oil, such as a lubricating oil from one or more of the parts of the power transmission, etc. The cooling circuit has heat exchanging means arranged in the stationary part of the wind turbine, such as a reservoir for the cooling liquid arranged in the tower and allowing for heat exchange between the cooling liquid in the reservoir and water contained within the tower which again exchanges heat with the environment exterior to the tower, which preferably is the sea. The tower itself may alternatively constitute the reservoir and the heat exchanging surfaces be the walls of the tower.

Instead of a reservoir, a cooling coil may be arranged in the tower being filled with water and/or a heat exchanger comprising one or more pumps for forcing a secondary cooling liquid being external to the closed circuit pass heat exchanging surfaces for exchanging heat with the cooling liquid comprised in the closed circuit. Other sources of secondary cooling liquids than seawater could be used, such as ground water or water to be used in a district heating system or another system in which the heat from the power transmission system is utilised.

Alternatively to the closed circuit, the cooling system may comprise an open circuit in which a cooling liquid from an external source, such as seawater, is conducted to the nacelle and after having exchanged heat with the power transmission system again is conducted to the exterior of the wind turbine.

The recesses defining the passage ways 4, 5 may instead of being circular recesses be formed as separated parts of a circular recess each having a channel for conducting liquid to or from the part of the circular recess.

The cooling circuit comprises one or more pumping means for forcing the flow of the cooling liquid through the circuit. The volume flow of the cooling liquid may be constant or adjustable by means of a plurality of pumps arranged in series and/or one or more of said pumps having means for adjusting the volume flow of liquid through the pump.

Both parts 2, 3 of the transfer unit 1 are preferably supported by the tower or by the nacelle in order to enable that the parts 2, 3 may pivot relatively to each other with less tolerance compared to the tolerance with which the nacelle pivots relatively to the tower. The part 2, 3 of the transfer unit 1 that is supposed to be stationary with respect to the non-supporting part, the nacelle or the tower, of the wind turbine is equipped with a carrier mounted on said part 2, 3 and engaging with the nonsupporting part of the wind turbine.

Figure 2:
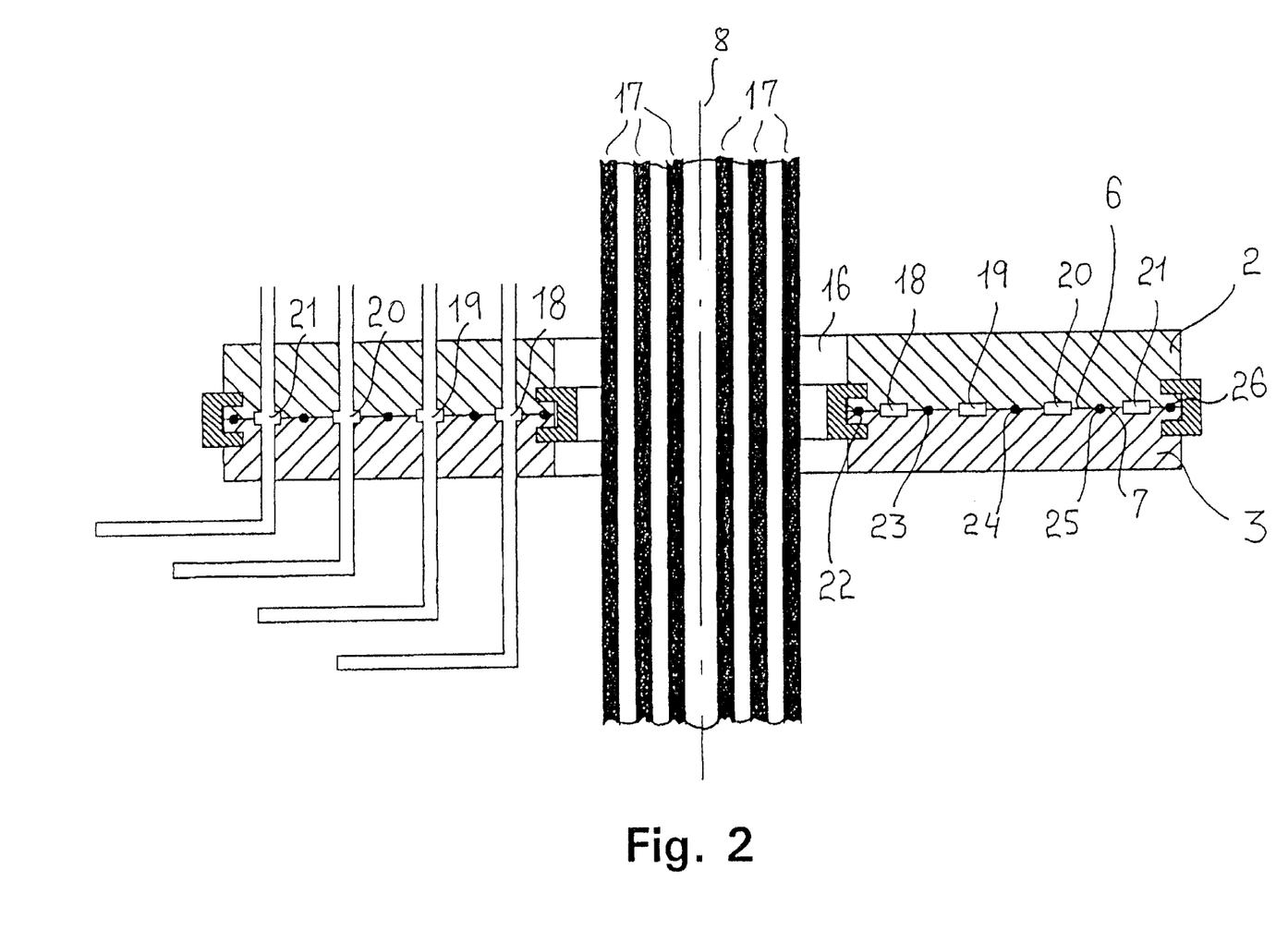
FIG. 2 shows a transfer unit with four passageways between horizontal surfaces.

The embodiment of a transfer unit 1 according to the invention and shown in FIG. 2 is a transfer unit 1 with four passage ways 18–21 between horizontal surfaces 6, 7. The four passage ways 18–21 are used for conducting cooling liquid in two separate circuit, e.g. one circuit for cooling the generator and one for cooling the gear box. The passageways 18–21 are formed similar to the passageways 4, 5 in the embodiment of FIG. 1 and are further defined by O-rings 22–26.

Figure 3:
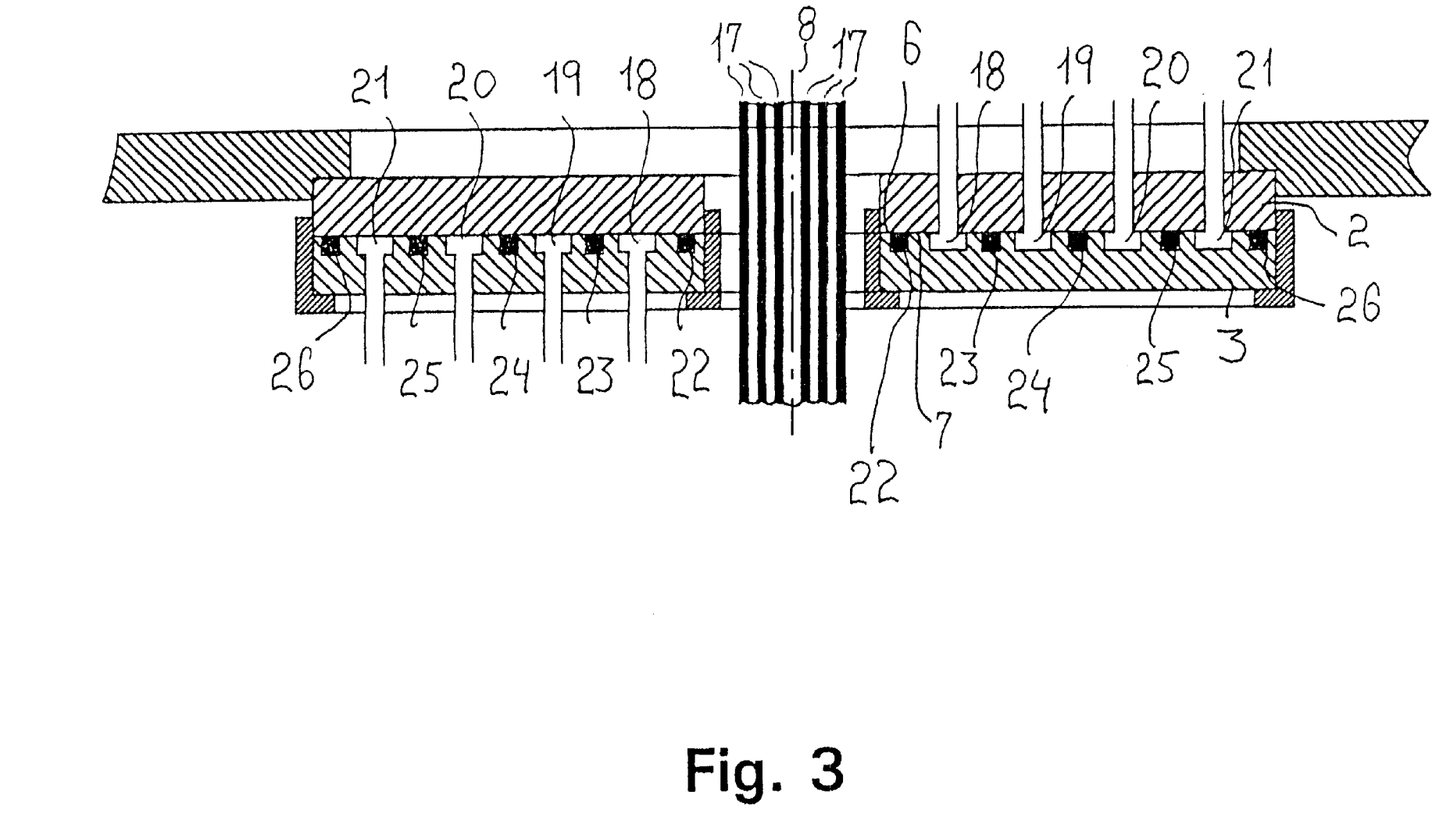
FIG. 3 shows a transfer unit similar to the one shown in FIG. 2, wherein the surface of the upper part has a plane surface.

The embodiment shown in FIG. 3 is similar to the one shown in FIG. 2 with the exception that the surface of the upper part has a plane surface 6 so that the passage ways 18–21 are defined by recesses in the surface 7 of the lower part 3 and the O-rings 22–26 are retained by recesses in the same surface 7. Thus, the surface 6 of the upper part 2 is in the shown embodiment according to the invention easier to manufacture than the surfaces 6 of the upper part 2 of the embodiments previously shown.

Figure 4:
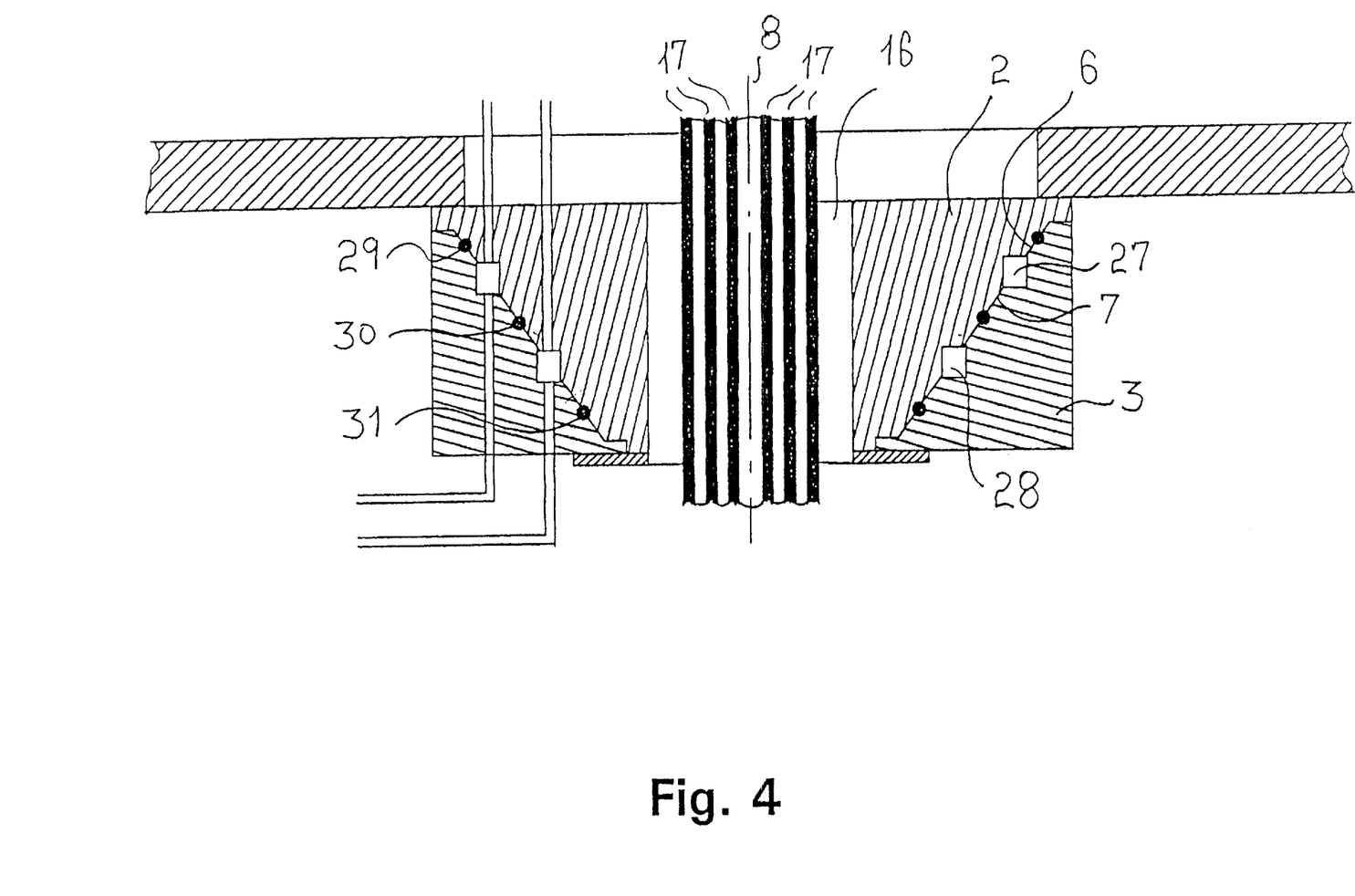
FIG. 4 shows a transfer unit wherein the passage ways are defined between conical surfaces.

FIG. 4 shows a transfer unit 1 wherein two passageways 27, 28 are defined between conical surfaces 6, 7 of the upper part 2 and the lower part 3 and three O-rings 2931.

Figure 5:
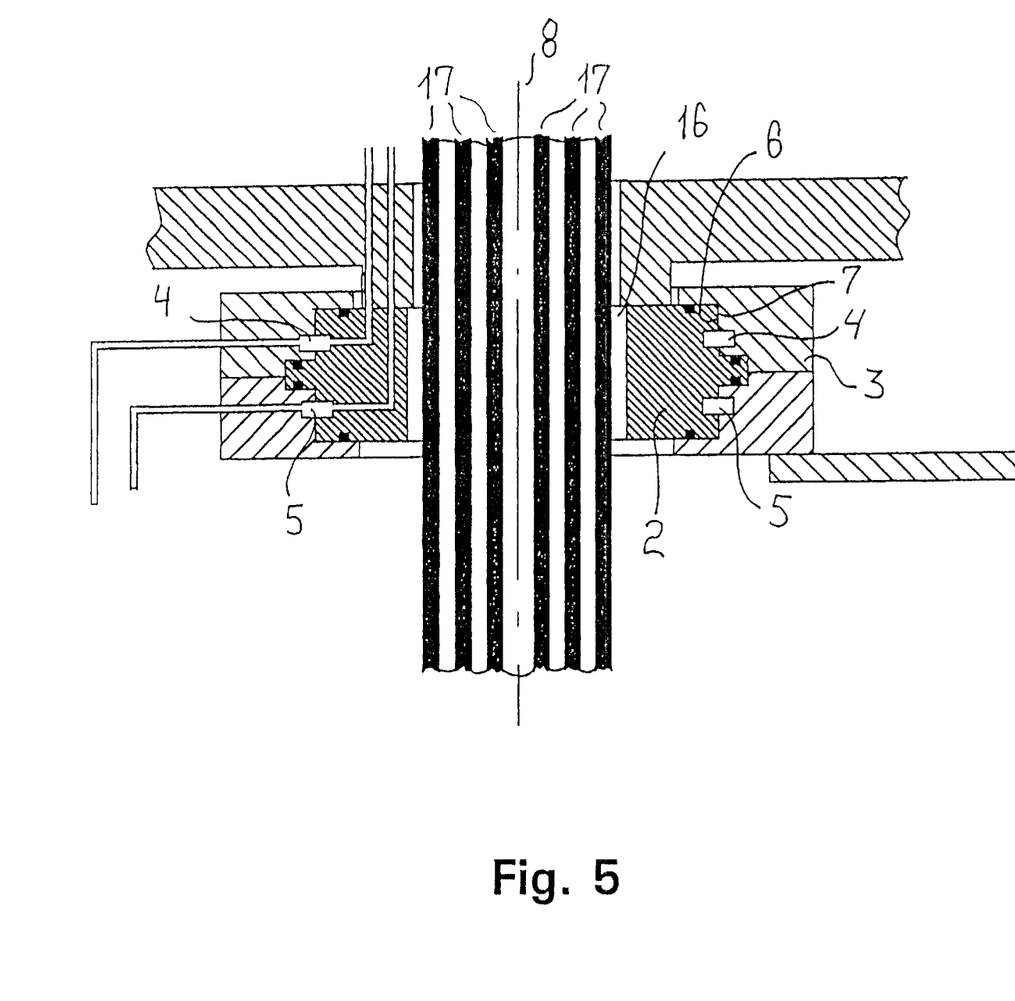
FIG. 5 illustrates a transfer unit wherein the passageways are defined between vertical surfaces.
Figure 6:
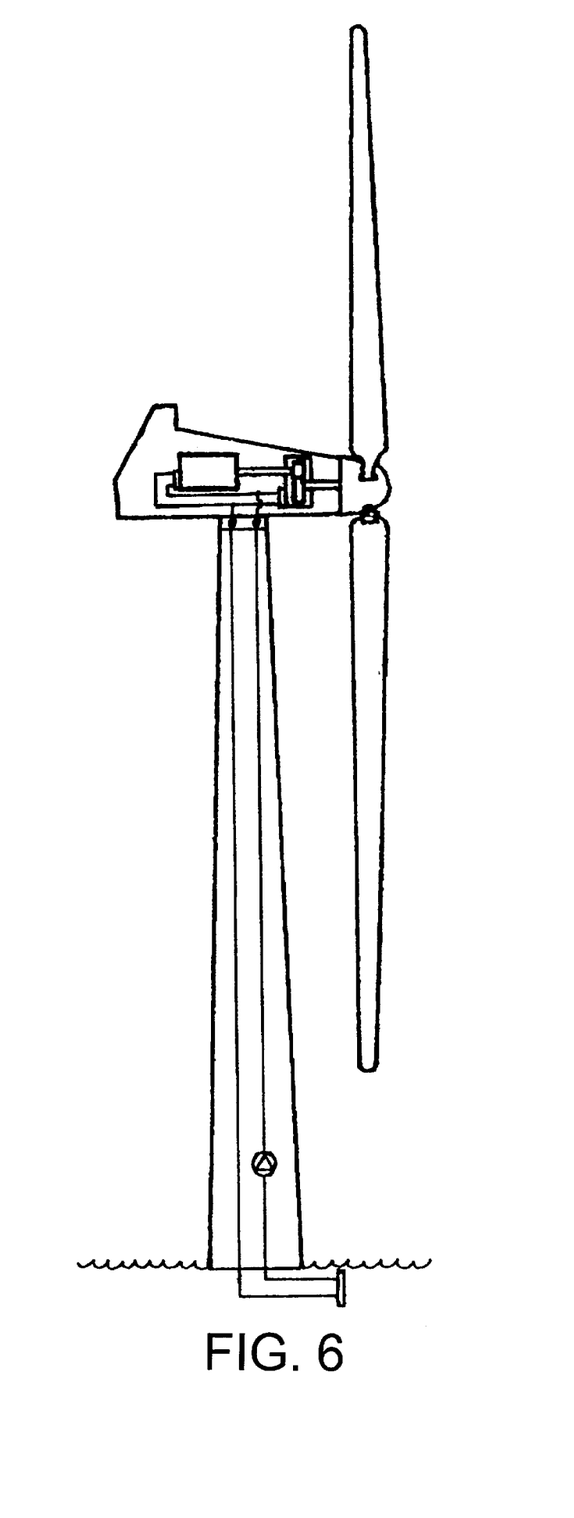
FIG. 6 illustrates a wind turbine showing the tower, the nacelle comprising a wind rotor, the power transmission system, the yawing system, pumping means, conduction means, and heat exchange means.

FIG. 5 illustrates a transfer unit 1 wherein two passage ways 4, 5 are defined between vertical surfaces 6, 7 of a first part 2 and a second part 3 of the transfer unit 1.

Each of the wind turbines of the embodiments shown has the main shaft parallel to the direction of the wind and its blades extending perpendicularly to the main shaft. The wind turbines are basically up-wind turbines, but may also be down-wind turbines.

What is claimed is:

1. An off-shore wind turbine comprising
    a stationary part including a tower extending substantially vertically,
    a nacelle comprising a wind rotor having at least one blade arranged on a main shaft having a substantially horizontal rotation axis, and a power transmission system,
    a yawing system comprising a stationary part being fixed to an upper end of the tower and a movable part being fixed to the nacelle, the stationary part and the movable part being designed so that the nacelle is being supported vertically and horizontally by the tower and may pivot relatively to the tower about a substantially vertical yawing axis, and
    a cooling system for transferring excessive heat from the power transmission system to seawater surrounding the wind turbine, the cooling system comprising first conduction means for conducting a flow of cooling liquid from the stationary part of the wind turbine and to the nacelle during normal operational conditions and at most positions of the nacelle relative to the tower, pumping means for pumping the flow of cooling liquid through the first conducting means and first heat exchanging means for transferring heat from the power transmission system to the cooling liquid.

2. A wind turbine according to claim 1, wherein the cooling system further comprises second conduction means for conducting the flow of liquid from the nacelle and to the stationary part of the wind turbine during normal operational conditions and at most positions of the nacelle relative to the tower, the first conduction mean and the second conduction means forming part of a single circuit.

3. A wind turbine according to claim 2, wherein the circuit is a closed circuit and the cooling system further comprises second heat exchanging means for transferring heat from the cooling liquid to the seawater, the second heat exchanging means being placed in or in the vicinity of the stationary part of the wind turbine.

4. A wind turbine according to claim 3, wherein the closed circuit is formed so that the cooling liquid therein can be pressurised, the closed circuit being sealed off from the environment in a substantially pressure-proof manner, and wherein the cooling liquid at least substantially fills the interior of the circuit.

5. A wind turbine according to claim 3, wherein the pumping means for pumping the flow of the cooling liquid through the closed circuit is solely situated in the nacelle.

6. A wind turbine according to claim 3, wherein the second heat exchanging means is placed near an upper end of the tower.

7. A wind turbine according to claim 3, wherein the second heat exchanging means is placed near a lower end of the tower.

8. A wind turbine according to claim 3, wherein the cooling system further comprises second pumping means for forcing a flow of the seawater past heat exchanging surfaces of the second heat exchanging means.

9. A wind turbine according to claim 3, wherein the cooling liquid is an oil.

10. A wind turbine according to claim 9, wherein the closed circuit comprises a lubrication circuit of at least a part of the power transmission system, the oil being a lubricant of said part of the power transmission system.

11. A wind turbine according to claim 3, wherein the cooling liquid comprises water.

12. A wind turbine according to claim 11, wherein the cooling liquid further comprises an agent for lowering the freezing temperature of the water.

13. A wind turbine according to claim 12, wherein the agent is glycerol.

14. A wind turbine according to claim 4, wherein the cooling system further comprises at least one further closed circuit according to any of said claims for conducting a flow of a cooling liquid between the nacelle and the stationary part of the wind turbine during normal operational conditions and at most positions of the nacelle relative to the tower.

15. A wind turbine according to claim 14, wherein the at least two circuits of the cooling system comprises different types of cooling liquids.

16. A wind turbine according to claim 1, wherein the liquid flowing in the conduction means of the cooling system is seawater.

17. A wind turbine according to claim 1, wherein the tower is hollow, partly submerged into the sea and partly filled with seawater, the heat from the power transmission system being transferred to said seawater within the tower by means of the cooling system.

18. A wind turbine according to claim 1, wherein the cooling system comprises system control means for controlling its operation, the control means comprising a plurality of temperature sensors each adapted for detecting a temperature of a part of the transmission system or the cooling liquid and for producing an output accordingly to the system control means, heat exchanger control means for controlling the operation of at least two heat exchanging means of the first heat exchanging means, said at least two heat exchanging means transferring heat from separate parts of the power transmission system, and pump control means for controlling the operation of the pumping means, the system control means being adapted to control the operation of the cooling system so that the temperature of the parts of the power transmission system is aimed to be within predefined temperature ranges.

19. A wind turbine according to claim 18, wherein the cooling system further comprises a heat pump arranged for transferring heat from the seawater to the cooling liquid so as to heat the cooling liquid, the system control means being adapted to control the cooling system to raise the temperature of parts of the power transmission system if the temperature of said parts is below a predetermined threshold value.

20. A wind turbine according claim 1, wherein an opening is defined between the nacelle and the tower, said opening being positioned so that the vertical yawing axis passes through the opening, at least one power cable for transferring power from the power transmission system passes through the opening.

21. A wind turbine according to claim 20, wherein at least one liquid conducting means forming part of the cooling system passes through the opening.

22. A wind turbine according to claim 21, wherein at least one of the at least one liquid conducting means is a pipe being concentric with the vertical yawing axis.

23. A wind turbine according to claim 22, wherein at least one of the liquid conducting means is a flexible hose.

24. A wind turbine according to claim 21, further comprising heat isolating means between at least one of the at least one power cable and at least one of the at least one liquid conducting means so as to-reduce heat transfer there between.

25. A wind turbine according to claim 20, wherein the wind turbine comprises drive means for driving the pivoting of the nacelle relatively to the tower and control means for controlling said drive means so that the nacelle will pivot less than a predetermined number of turns relatively to a predetermined position of the nacelle so as to prevent excessive twisting of flexible parts passing through the opening and being fixed at one end to the nacelle and at an other end to the stationary part.

26. A wind turbine comprising a stationary part including a tower extending substantially vertically, a nacelle comprising a wind rotor having at least one blade arranged on a main shaft having a substantially horizontal rotation axis and a power transmission system, a yawing system comprising a stationary part being fixed to an upper end of the tower and a movable part being fixed to the nacelle, the stationary part and the movable part being designed so that the nacelle is being supported vertically and horizontally by the tower and may pivot relatively to the tower about a substantially vertical yawing axis, and a cooling system for transferring heat from the power transmission system and comprising first conduction means for conducting a flow of cooling liquid from the stationary part of the wind turbine and to the nacelle during normal operational conditions and at most positions of the nacelle relative to the tower, pumping means for pumping the flow of cooling liquid through the first conducting means and first heat exchanging means for transferring heat from the power transmission system to the cooling liquid, the cooling system further comprising a transfer unit for transferring liquid between the nacelle and the stationary part of the wind turbine, the unit comprising a first part being at least substantially stationary relatively to the tower and a second part being at least substantially stationary with respect to the nacelle, the first part and the second part being designed so that at least one passage way for a liquid flow is defined between substantially abutting surfaces of the parts during normal operational conditions and at most positions of the nacelle relatively to the tower, the passage way being part of the first conduction means of the cooling system for conducting the flow of cooling liquid.

27. A wind turbine according to claim 26, wherein at least a part of the at least one passage way for the liquid flow between the nacelle and the stationary part of the wind turbine is defined by means of a surface of the first part, a surface of the second part and by means of a first and of a second sealing means.

28. A wind turbine according to claim 27, wherein the first and the second sealing means each forms a circle with its centre on the vertical yawing axis and each of the first and the second sealing means extends in a plane being perpendicular to the yawing axis, whereby an annular passage way for liquid flow is defined between the first and the second sealing means and said surfaces of the first and the second part.

29. A wind turbine according to claim 28, wherein the first and the second sealing means extend in substantially the same plane and form concentric circles.

30. A wind turbine according to claim 28, wherein the first and the second sealing means extend in planes having a mutual distance along the vertical yawing axis.

31. A wind turbine according to claim 30, wherein the first and the second sealing means form circles having substantially the same diameter.

32. A wind turbine according to claim 30, wherein the first and the second sealing means form circles having different diameters.

33. A wind,turbine according to claim 27, wherein at least one of the sealing means comprises an O-ring formed from a resilient material.

34. A wind turbine according to claim 33, wherein only one of the first and second part of the transfer unit comprises a recess for retaining said O-ring.

35. A wind turbine according to claim 27, wherein at least one of the sealing means is a narrow clearance formed by surfaces of the first and the second part of the transfer unit so that said surfaces constitute a labyrinth packing.

36. A wind turbine according to claim 27, wherein at least one of the sealing means comprises a flexible elongated strip of which one edge is fixed to the first part, respectively to the second part, and the other edge is forced into abutting contact with a surface of the second part, respectively the first part.

37. A wind turbine according to claim 36, wherein the edge of the strip is forced into abutting contact at least partly by the pressure of the fluid.

38. A wind turbine according to claim 37, wherein the strip is formed from a resilient material and the edge of the strip is forced into abutting contact at least partly by resilient forces.

39. A wind turbine according to claim 26, wherein the first part and the second part of the transfer unit each has at least one channel formed therein between the exterior and each of the at-least one passage ways for a liquid flow defined between surfaces of the -parts of the transfer unit, said channels being parts of the conduction means for conducting a flow of liquid.

40. A wind turbine according to claim 26, wherein the transfer unit is supported by the tower and the second part is induced to follow the pivotal movements of the nacelle by a carrier mounted on the second part and engaging with the nacelle.

41. A wind turbine according to claim 26, wherein the transfer unit is supported by then nacelle and the first part is induced to remain stationary with respect to the tower by a carrier mounted on the first part and engaging with the tower.

42. A wind turbine according to claim 26, wherein the transfer unit constitutes an integrated part of a yaw bearing of the yawing system, said bearing being designed for absorbing forces between the nacelle and the tower.

43. A wind turbine according to claim 26, wherein more than one passage way for a liquid flow for the cooling system is defined similar to the one described.

44. A wind turbine according to claim 26, wherein at least a part of the transfer unit is formed from a synthetic material.

45. A wind turbine according to claim 26, wherein at least a part of the transfer unit is formed from an aluminium alloy.

46. A wind turbine according to claim 26, wherein at least a part of the transfer unit is formed from a stainless steel alloy.

47. A wind turbine according to claim 26, wherein at least a part of the transfer unit is formed from cast iron.

* * * * *